United States Patent [19]

Wilkerson

[11] 4,213,631
[45] Jul. 22, 1980

[54] VEHICLE WHEEL ALIGNMENT ADJUSTMENT DEVICE

[76] Inventor: Edward D. Wilkerson, P.O. Box 755 South Court, Normandy Beach, N.J. 08739

[21] Appl. No.: 918,199

[22] Filed: Jun. 22, 1978

[51] Int. Cl.² ............................................. B62D 17/00
[52] U.S. Cl. .................................... 280/661; 280/668
[58] Field of Search ...................... 280/661, 668, 95 R

[56] References Cited

U.S. PATENT DOCUMENTS

| | | | |
|---|---|---|---|
| 2,405,458 | 8/1946 | Slack et al. | 280/661 |
| 2,923,555 | 2/1960 | Kost et al. | 280/661 |
| 4,026,578 | 5/1977 | Mattson | 280/661 |

*Primary Examiner*—Robert R. Song

[57] ABSTRACT

An adjustment assembly for independently or simultaneously changing the caster and camber angles of the front wheels of a vehicle having a single axis suspension device, such as the MacPherson Strut, between the lower control arm and the upper control bracket that uses circular plates that may be fixed to the upper control bracket in any of four 90 degree angularly related positions with an eccentric aperture for laterally supporting the strut in numerous angular positions to vary the wheel spindle's caster and camber angles independently or simultaneously as desired.

8 Claims, 8 Drawing Figures

LEFT | FRONT OF VEHICLE

VEHICLE WHEEL ALIGNMENT ADJUSTMENT DEVICE

BACKGROUND OF THE PRESENT INVENTION

The attitude of vehicle wheel spindles, commonly known as wheel alignment, is very important to the vehicle's handling and steering characteristics. The down-sizing of automobiles during the last two decades has resulted in the development of more compact and less costly suspension systems. One of these is commonly referred to as the MacPherson Strut and this is a single axis front end (and sometimes also rear end) suspension system consisting essentially of a shock absorber, a coil spring and ball joints, all in a single axis assembly. This strut reacts between a pivotal frame member known as a lower control arm and an upper bracket fixed to the frame or body of the vehicle. This arrangement also eliminates the necessity for what is referred to in some suspension systems as an upper control arm.

While this suspension system has been found to be suitable for certain small sized automobiles, for the most part, it only conveniently permits adjustment of the "toe-in" of the wheel spindle. Toe-in, of course, is the degree to which the wheels point toward one another. It has however, been found difficult to provide any simple arrangement for adjusting the caster or camber angles in the MacPherson Strut suspension. Camber, of course, is the degree to which the wheels lean toward one another—an increase in camber being the degree to which the wheels lean outward from factory specification and a decrease in camber representing a further leaning of the wheels toward one another from specification. The caster angle is the angular pivot of the wheel and wheel spindle assembly about the steering axis of the vehicle—a backward pivot from factory specification being defined as an increase in caster angle and the forward pivot being a decrease in the caster angle.

Attempts have been made to provide the MacPherson Strut with a caster and camber adjustment but because of their cost and complexity, they have been eliminated from the lower priced suspension systems. Moreover, most of these appear to provide only a simultaneous adjustment in caster and camber which is undesirable. For example, the Mattson U.S. Pat. No. 4,026,578 shows a MacPherson Strut assembly capable of simultaneous caster and camber adjustments by the provision of an eccentric at the lower end of the strut assembly adjacent the steering arm. This is an extremely costly assembly and provides only a limited degree of adjustment that also precludes the adjustment of camber and caster independently which is important.

The present invention seeks to ameliorate the problems described above in the prior art.

SUMMARY OF THE PRESENT INVENTION

According to the present invention, an adjustment assembly is provided for a MacPherson type suspension system that permits the independent adjustment of wheel spindle caster and camber in an inexpensive manner. This is achieved by the provision of a plurality of circular plates with offset apertures therein that may be selectively fixed to the upper control bracket to laterally position the top end of the strut assembly forwardly, rearwardly, from side to side or a combination of the two from the original factory set position.

The upper control bracket is provided at the factory with an opening that is sufficiently large to permit the strut to be adjusted laterally in all directions. There are an even number of fasteners on this bracket that are received in corresponding holes in the circular strut supporting plates. The even number of holes and fasteners permits the discs to be mounted in any one of four 90 degree positions on the upper control bracket. At the factory, a disc is installed having a centrally disposed aperture for receiving the upper end of the strut. This aperture, of course, is set to factory alignment specifications for caster and camber. Thereafter, if adjustment of caster or camber is desired, or a combination of both, a similar circular plate is installed with this plate having an eccentrically offset opening. Since any disc may be mounted in four positions, a single disc can either increase or decrease the caster a predetermined amount and also increase or decrease the camber a predetermined amount.

By providing a plurality of eccentric plates, each with a different degree of offset, and labeled in one half degree increments, a wide variety of increase and decrease of both caster and camber can be provided for with a minimum number of plates. For example, if the strut assembly were acting on a 24 inch fulcrum from the lower control arm to the upper bracket adjustment plate each ¼ inch variation in their supporting hole, or degree of eccentricity, will provide approximately two and one half degrees of camber or wheel spindle axis adjustment. For one half degree variation, the degree of eccentricity would be approximately one fifth of that or 0.050 inch offset differential.

Another series of plates are also provided where the eccentric apertures are positioned to simultaneously increase both caster and camber.

DETAILED DESCRIPTION OF THE PREFERRED EMBODIMENT

Figure 1:
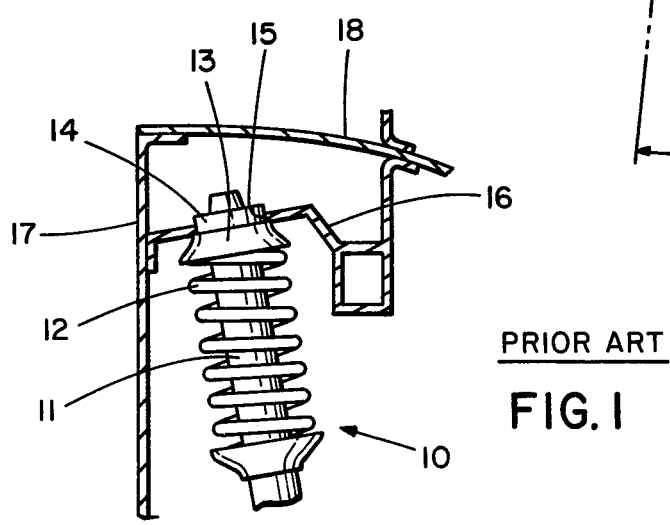
FIG. 1 is an illustration of a conventional mounting for a MacPherson Strut.

Referring to the drawings and initially to the prior art construction shown in FIG. 1, a MacPherson Strut assembly 10 is seen to include an extensible shock member 11 with a coil spring 12 surrounding the shock member and reacting against an upper spring seat 13 assembled with a mounting ring 14. The mounting ring 14 is supported laterally by an aperture 15 in an upper mounting bracket 16 fixed to the vehicle body panels 17 and 18.

Figure 2:
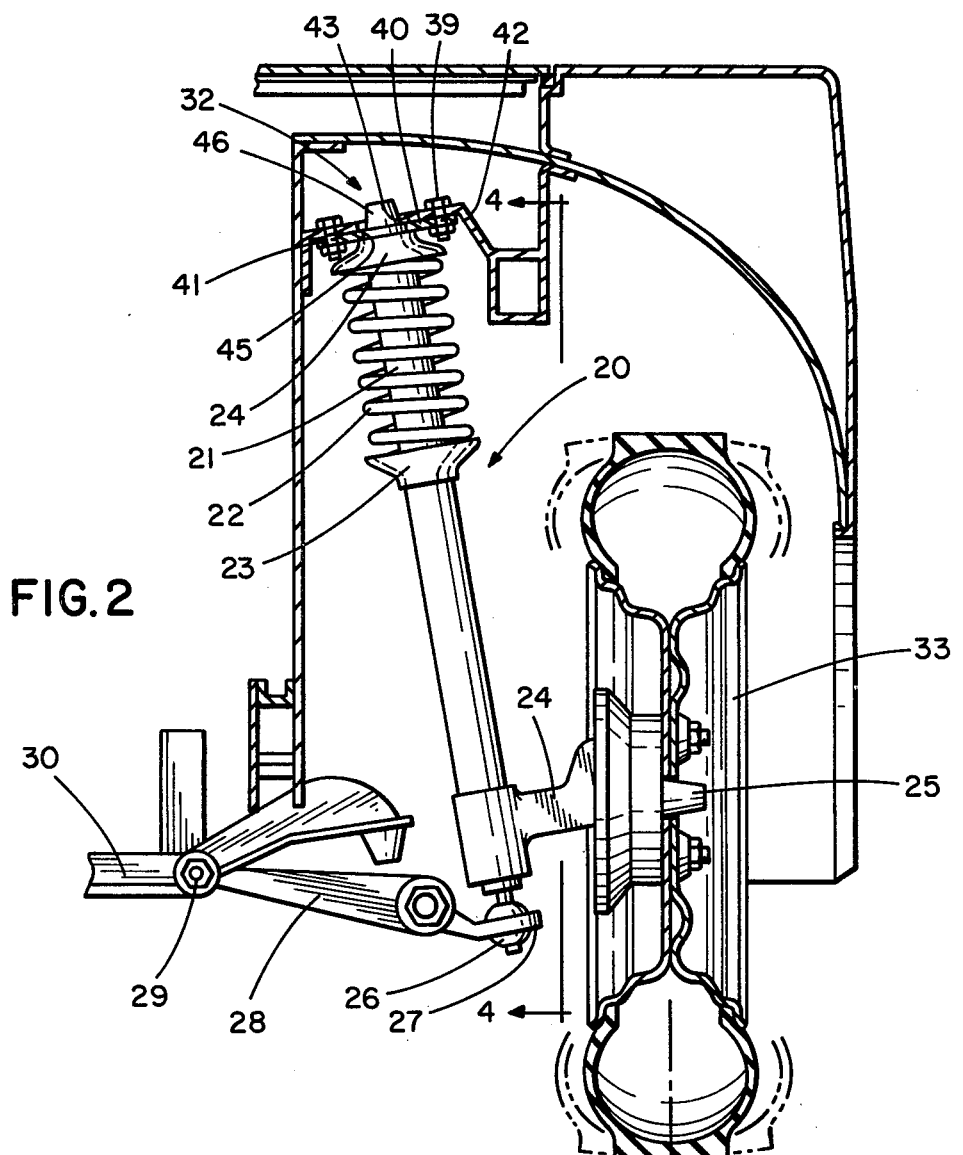
FIG. 2 is a sectional view of the right front suspension system of a vehicle according to the present invention.

Viewing FIG. 2 which shows the preferred embodiment of the present invention, a MacPherson Strut assembly 20 is provided that is seen to include a compressible shock strut 21 with a coil spring 22 therebetween reacting between a lower spring seat 23 and an upper spring seat 24.

The lower end of the strut 20 carries the wheel spindle support member 24 having a wheel spindle 25 rotatably supported thereon. The lower end of the strut has ball member 26 thereon forming with bearing 27 a ball joint, carried by a lower control arm 28 pivotally mounted at 29 to a horizontal transverse frame member 30.

Figure 3:
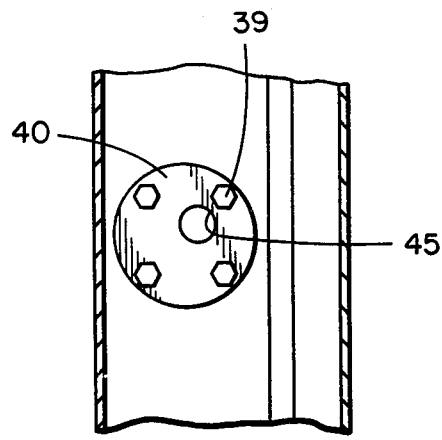
FIG. 3 is a top view of the suspension system showing a circular plate according to the present invention.
Figure 4:
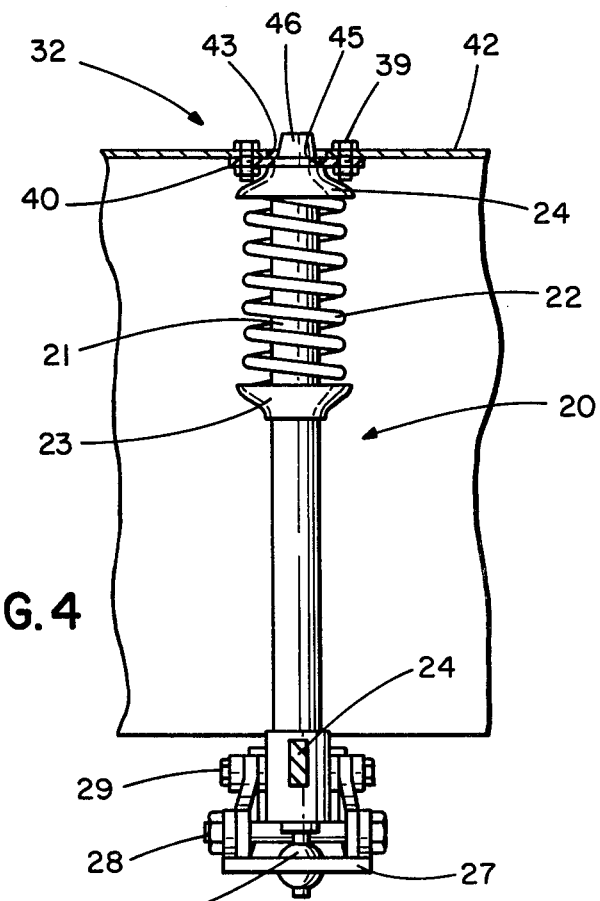
FIG. 4 is a right section taken generally along line 4—4 of FIG. 2.
Figure 5:
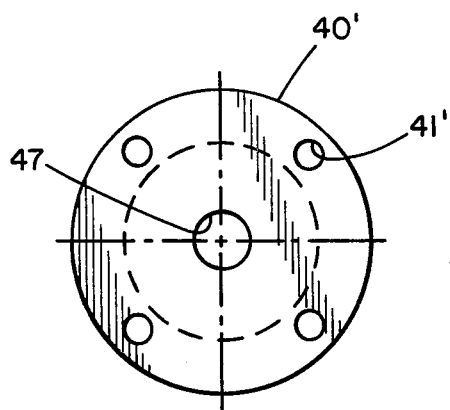
FIG. 5 is an enlarged view of one of the circular plates according to the present invention to be mounted at the factory.

An adjustment assembly 32 is provided for alterally psoitioning the upper end of the strut 20 to independently or simultaneously vary the caster and camber of the axis of wheel spindle 25 and wheel 33. Toward this end and as seen in FIGS. 2, 3 and 4, a plurality of fasteners 39 are provided and there are an even number of these fasteners, four being shown for the purpose of illustration. A circular plate 40 has holes 41 for receiving the fasteners 39 and affixing the plate 40 to the upper vehicle bracket 42. The upper vehicle bracket 42 has an opening 43 therein that will permit adjustment of the strut in all directions. The plate 40 has an opening 45 therein that receives a reduced end 46 of the strut 20 to laterally position the strut.

Viewing FIGS. 5, 6, 7 and 8, it should be understood that the front of the vehicle is at the top of the sheet and the view is looking downwardly from above the vehicle onto the plates of the left front of the vehicle. The plate 40' shown in FIG. 5 has a central opening 47 therein and this plate is used at the factory during the manufacture of the automobile to achieve the factory specifications for both caster and camber.

Figure 6:
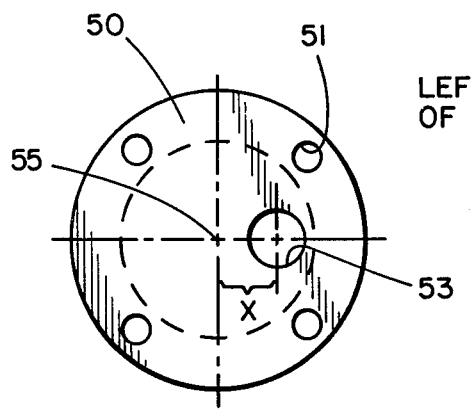
FIG. 6 is one of the circular plates with the opening offset and mounted to provide a predetermined decrease in the camber angle of the left front wheel spindle.
Figure 7:
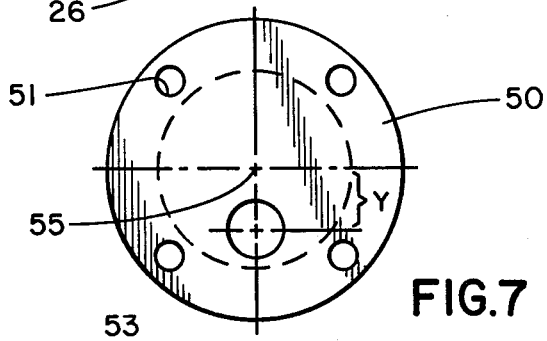
FIG. 7 is the same plate as shown in FIG. 6 but mounted on the bracket to provide a predetermined increase in caster angle.

A plurality of plates 50 are also provided such as shown in FIGS. 6 and 7 having identically positioned holes 51 but with the strut supporting aperture 53 offset a predetermined distance X from the metric center 55 of the plate in only one direction. This same plate 50 can be used to provide a predetermined increase or decrease in camber angle (with FIG. 6 illustrating the mounted position of the plate for a predetermined decrease in camber) or a predetermined increase or decrease in the caster angle (with a perdetermined increase in caster being shown by the mounted position of the plate in FIG. 7) depending upon the 90 degree position that the plate 50 is mounted on the upper bracket 42. The even number of fasteners 39 permit this 90 degree four position location of the plate 50.

According to the present invention, a plurality of plates 50 are provided each with a different incremental offset X to achieve one half degree differential in caster and camber angles.

Figure 8:
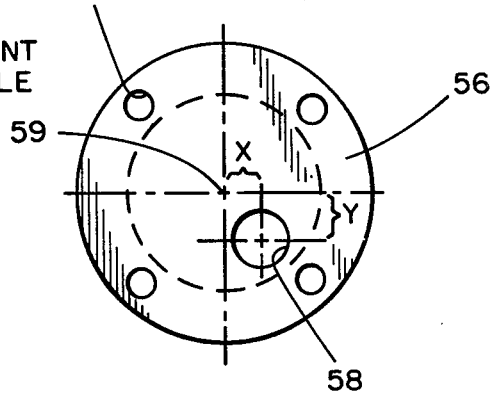
FIG. 8 is a different plate having its opening positioned to achieve a predetermined decrease in camber and increase in caster.

A further set of plates are provided represented by plate 56 in FIG. 8 that have holes 57 positioned in the same manner as plates 40 and 50 but with apertures 58 offset a distance X in one direction from center 59 and also a distance Y in the other direction from the center so that both camber and caster would be changed by the mounting of plate 56. There are provided a plurality of plates 56 according to the present invention, each with incrementally different X and Y offsets to provide a variety of simultaneous caster and camber changes from the original specification. In this embodiment, the plate 56 can be mounted to achieve eight different caster and camber angle combinations—rather than just four as in the embodiment of FIGS. 6 and 7, simply reversing the plate 56.

What is claimed is:

1. An adjustment assembly for varying the attitude of a wheel spindle about the steering axis of a vehicle wherein the spindle is supported on a lower control member with a compressible strut of the MacPherson type between the lower control member and the upper control member, comprising; an opening in the upper control member of sufficient size to permit lateral adjustment of the strut, a plurality of removable fastener means carried by the upper control member, and plate means secured by said fastener means to said upper control member engaging said strut to determine the angular position of the strut and the attitude of the wheel spindle, said plate means being flat and having a circular opening for engaging and laterally supporting the upper end of the MacPherson strut.

2. An adjustment assembly for varying the attitude of a wheel spindle about the steering axis of a vehicle wherein the spindle is supported on a lower control member with a compressible strut having a lower end connected to the lower control member and an upper end connected to an upper control member, comprising; fastener means carried by said upper control member, a plurality of plates selectively secured to the upper control member by said fastener means, and each of said plates having an aperture therein positioned a different distance from the geometric center of the plate for receiving the upper end of the compressible strut whereby the plates may be interchanged to vary the angle of the strut and the wheel spindle attitude.

3. An adjustment assembly for varying the attitude of a wheel spindle about the steering axis of a vehicle wherein the spindle is supported on a lower control member with a compressible strut between the lower control member and an upper control member, comprising; a plurality of fasteners symmetrically fixed to the upper control member, a plate having apertures symmetrically disposed to receive the fasteners and fix the plate in any of four 90 degree positions, and said plate having an eccentric aperture therein for laterally supporting the strut whereby a single plate may be used to independently increase or decrease wheel spindle caster or camber.

4. An adjustment assembly for varying the attitude of a wheel spindle about the steering axis of a vehicle wherein the spindle is supported on a lower control member with a compressible strut between the lower control member and an upper control member, comprising; an opening in the upper control member of sufficient size to prevent lateral adjustment of the strut, a plurality of fastener means carried by the upper control member, and plate means secured by said fastener means to said upper control member for engaging said strut to determine the angular position of the strut and the attitude of the wheel spindle, there being provided an even number of fastener means on said upper control member, said plate means being a circular plate with apertures therein for securing the symmetrically positioned fastener elements so that the plate may be positioned in any one of four positions on the upper control member, said circular plate having an aperture therein for supporting the strut laterally, said aperture being offset from the geometric axis of the plate so that a single one of said plates may be selectively positioned to fix the strut in four angular positions to adjust wheel spindle attitude.

5. An adjustment assembly for varying the attitude of a wheel spindle about the steering axis of a vehicle as defined in claim 2, wherein a single one of said plates has an aperture positioned to adjust the camber angle independently of the caster angle and also to adjust the caster angle of the strut independently of the camber angle, and another of said plates has an aperture therein positioned to vary both the caster angle and camber angle simultaneously.

6. An adjustment assembly for varying the attitude of a wheel spindle about the steering axis of a vehicle wherein the spindle is supported on a lower control member with a compressible strut between the lower control member and an upper control member, an opening in said upper control member sufficiently large to permit lateral adjustment of said strut, an even number of fasteners carried by said upper control arm positioned about the opening, a circular plate secured to said upper control arm by the fasteners through symmetrically positioned holes therein so that the plate may be positioned in four different 90 degree positions on the upper control member, and an opening in said plate for laterally supporting the strut, said opening being eccentric with respect to the geometric center of the plate so that the plate may adjust the angle of the strut in four directions and the increase and decrease of both the caster of the strut and camber of the wheel spindle.

7. A suspension assembly for the steering wheels of a vehicle having a lower control arm and a fixed upper control member, comprising: a MacPherson type compressible strut connected at its lower end to the lower control member, a plurality of removable fasteners extending through the upper control member, a substantially flat relatively thin plate having a plurality of apertures therein receiving the fasteners and fixedly connected thereby to the upper control member, said plate having a circular opening of predetermined diameter extending completely therethrough for laterally supporting the upper end of the MacPherson strut to determine the angular position of the strut and the attitude of the wheel spindle, said plate being readily removable so that a plate having differently located openings may be replaced to change the attitude of the wheel spindle.

8. A suspension assembly for the steering wheels of a vehicle having a lower control arm and a fixed upper control member as defined in claim 7, wherein the removable fasteners are symmetrically positioned, said opening in the plate being eccentric with respect to the center of symmetry of the fasteners.

* * * * *